United States Patent [19]
Rashid

[11] Patent Number: 5,905,457
[45] Date of Patent: May 18, 1999

[54] VEHICLE RADAR SAFETY APPARATUS

[76] Inventor: Charles Rashid, 31224 Merrily, Roseville, Mich. 48066

[21] Appl. No.: 08/022,372

[22] Filed: Feb. 25, 1993

Related U.S. Application Data

[63] Continuation-in-part of application No. 07/812,053, Dec. 17, 1991, abandoned, which is a continuation-in-part of application No. 07/595,995, Oct. 11, 1990, abandoned.

[51] Int. Cl.$^6$ .................................................... G01S 13/93
[52] U.S. Cl. ............................... 342/70; 342/71; 343/785
[58] Field of Search ........................ 342/70–72; 343/711, 343/785, 786

[56] References Cited

U.S. PATENT DOCUMENTS

| | | | |
|---|---|---|---|
| 2,804,160 | 8/1957 | Rashid | 180/82.1 |
| 3,153,230 | 10/1964 | Van Krevelen et al. | |
| 3,383,678 | 5/1968 | Palmer. | |
| 3,683,387 | 8/1972 | Meek | 343/761 |
| 3,689,882 | 9/1972 | Dessailly. | |
| 3,697,985 | 10/1972 | Faris et al. | 343/5 PD |
| 3,701,160 | 10/1972 | Bequin | 343/755 |
| 3,710,383 | 1/1973 | Cherry et al. | 343/7 ED |
| 3,725,921 | 4/1973 | Weidman et al. | |
| 3,778,826 | 12/1973 | Flannery et al. | |
| 3,795,426 | 3/1974 | Sisson | 303/21 F |
| 3,820,622 | 6/1974 | Powell | 180/98 |
| 3,856,105 | 12/1974 | Lewis et al. | 180/98 |
| 3,870,994 | 3/1975 | McCormidk et al. | 343/6.5 |
| 3,898,652 | 8/1975 | Rashid | 343/6 R |
| 4,060,805 | 11/1977 | McComas | 343/6.5 |
| 4,106,023 | 8/1978 | Baghdady. | |
| 4,128,839 | 12/1978 | McComas | 343/112 |
| 4,148,040 | 4/1979 | Lunden et al. | 343/708 |
| 4,203,113 | 5/1980 | Baghdady. | |
| 4,259,743 | 3/1981 | Kaneko et al. | 342/70 X |
| 4,293,859 | 10/1981 | Sergent | 343/702 |
| 4,318,103 | 3/1982 | Roettele et al. | 343/18 E |
| 4,382,291 | 5/1983 | Nakauchi. | |
| 4,477,816 | 10/1984 | Cho | 343/786 |
| 4,543,577 | 9/1985 | Tachibana et al. | |
| 4,621,705 | 11/1986 | Etoh | 180/169 |
| 4,628,317 | 12/1986 | Nishikawa et al. | 340/903 |
| 4,660,050 | 4/1987 | Phillips | 343/753 |
| 4,673,937 | 6/1987 | Davis | 342/72 |
| 4,703,429 | 10/1987 | Sakata | 364/426 |
| 4,855,748 | 8/1989 | Brandao et al. | 342/455 |
| 4,914,733 | 4/1990 | Gralnick | 340/961 |
| 4,916,450 | 4/1990 | Davis | 342/71 |
| 4,945,550 | 7/1990 | Krause et al. | 375/94 |
| 5,008,844 | 4/1991 | Kyriakos et al. | 364/571.05 |
| 5,053,979 | 10/1991 | Etoh | 364/565 |

OTHER PUBLICATIONS

"Two Groups are Developing Radar—Based Collision—Avoidance Systems for Autos", Electronics, vol. 50, No. 4, pp. 7E–8E, Feb. 17, 1977.
"Millimeter Wave Components & Subsystems", Alpha Industries, Inc., 1987, pp. 5–2, 5–3 and 5–4.

*Primary Examiner*—Gilberto Barron, Jr.
*Attorney, Agent, or Firm*—Young & Basile, PC

[57] ABSTRACT

A vehicle radar safety apparatus employs a radar for detecting an object in front and/or to the rear and sides of a vehicle and for producing an indication of the distance and closing speed between the vehicle and the detected object. A signal processing unit sums the vehicle speed and the closing speed between the vehicle and detected object and compares the summed output with a signal corresponding to the distance between the vehicle and the detected object to provide an output to a display indicating the vehicle's capability of stopping prior to colliding with the detected object. The output from the signal processing unit is optionally applied to an accelerator and/or brake control circuit to automatically slow down the vehicle. A brake pedal override switch is connected to the accelerator and brake controls to override the accelerator and/or brake controls when the vehicle operator depresses the vehicle brake pedal. The radar includes a horn antenna having a plano-convex dielectric lens mounted at an exterior end. The lens has an exterior convex surface shaped to reduce side lobe generation of the transmitted radar wave so as to transmit a radar wave of a minimal beam width at a specified operating frequency and effective radar antenna diameter.

8 Claims, 7 Drawing Sheets

VEHICLE RADAR SAFETY APPARATUS

CROSS REFERENCE TO CO-PENDING APPLICATION

This application is a continuation-in-part application of United States patent application Ser. No. 07/812,053 filed on Dec. 17, 1991 in the name of Charles E. Rashid and entitled "Vehicle Radar Safety Apparatus". Now abandoned which is a C-I-P of Ser. No. 07/595,995 filed Oct. 11, 1990 now abandoned.

BACKGROUND OF THE INVENTION

1. Field of the Invention

This invention relates, in general, to vehicle safety apparatus and, more specifically to vehicle safety apparatus for locating an object surrounding a moving vehicle and to provide an indication of the vehicle's capability of stopping to avoid collision with the detected object.

2. State of the Art

Radar systems for controlling a vehicle in response to the detection of an object surrounding the vehicle are known. U.S. Pat. No. 3,898,652 discloses such a vehicle radar system in which front, rear and side sensors are mounted on a vehicle. A radar means is connected to each of the sensors and calculates the distance and closing speed to an object detected by one of the sensors, particularly the front or rear sensors. The vehicle velocity is used to calculate a distance which, under existing conditions, is the minimum safe distance the vehicle should be with respect to the detected object if the detected object immediately stops, so as to provide an indication of the moving vehicle's capability of stopping without collision with the detected object.

The radar system provides an indication to the operator of the vehicle of the vehicle's capability of stopping prior to collision with the detected object. The indicator is preferably a visual indicator in the form of a light on a display console mounted in the vehicle. This radar system also provides for automatic control of the vehicle accelerator and/or brakes to automatically slow the vehicle down to avoid collision an with object detected in front or to the rear of the vehicle.

The existing road conditions, whether wet, dry or icy, is also a factor in the computation of the safe operating distance of the vehicle and is input to the radar control apparatus via a switch mounted on the operator console.

The radar employed for the front and rear sensors in this system is a Doppler radar. While the vehicle safety and protection system disclosed in this patent is effective in detecting and controlling the vehicle within safe operating limits to avoid a collision with a detected object, it has been found that certain improvements could be made to this system to improve its efficiency and to provide greater operator control over the system.

The Doppler radar employed in this patented system is large and requires a considerable amount of space in the vehicle. The large diameter radar and low operating frequencies is necessary to provide the desired narrow beam directly in front of or to the rear of the vehicle so as to avoid detecting objects to the sides of the vehicle which do not prevent a potential collision situation to the vehicle. Specifically, the radar in this patent as well as other similar prior art vehicle radar systems has an effective diameter of six inches at an operating frequency of 10 to 24 GHz. This effective diameter and operating frequency creates a radar beam having a 6° beam width which is particularly suited for vehicle applications as 6° covers one road lane width at the range of the radar. However, the six-inch diameter radar is large and unwieldy and cannot easily be mounted in existing vehicles due to minimal available space at the front and/or rear of such vehicles. However, merely employing a smaller effective diameter radar at a higher operating frequency, such as 24 GHz, has the effect of increasing the beam width to approximately 18°. This is unsuitable for vehicle applications as 18° would cover up to three lanes of roadway and thereby detect objects to the sides of the vehicle in front or back of the vehicle which do not pose a potential collision situation.

Thus, it would be desirable to provide a vehicle radar safety system which is capable of employing a smaller diameter radar than that previously employed in vehicle radar systems. It would also be desirable to provide such a small diameter radar in a vehicle radar system which is capable of operating at a high frequency and yet provides a sufficiently narrow radar beam. It would also be desirable to provide a vehicle radar safety apparatus which enables the operator of the vehicle to selectively control various operating features of the radar system. Finally, it would be desirable to provide a vehicle radar system which automatically compensates for existing road conditions, i.e., wet or dry.

SUMMARY OF THE INVENTION

The present invention is a vehicle radar safety apparatus which provides an indication to the driver of a vehicle of the presence of objects in front of the vehicle and, optionally, to the rear and sides of the vehicle, as well as providing an indication of the vehicle's capability of stopping prior to colliding with a detected object to the front and/or rear of the vehicle.

The vehicle radar safety apparatus comprises a front sensor means mounted on the vehicle for detecting objects to the front of the vehicle. A vehicle velocity sensor means provides an indication of the velocity of the vehicle. A signal processing means receives the outputs of the front sensor means and the vehicle velocity sensor means for producing a first output indicative of the vehicle's capability of stopping prior to colliding with an object detected by the front sensor means in front of the vehicle.

The signal processing means includes a radar means coupled to the front sensor means for producing a distance or range output indicative of the distance of the object detected by the front sensor from the vehicle. The signal processing means also includes a closing speed generating means coupled to the radar means for producing a signal indicative of the closing speed between the detected object and the vehicle. A vehicle velocity computer means is coupled to the vehicle velocity sensor means for producing a velocity output. Means are provided for summing the closing speed and the vehicle velocity and providing a summed output indicative thereof. Means, responsive to the summed output and the range output of the radar means, are provided for generating the first output when the summed output exceeds the range output.

In a preferred embodiment, the radar means includes a horn antenna having a small effective diameter when operating at a predetermined operating frequency. The horn antenna has first and second spaced ends and a side wall tapering inwardly from the second end to the first end. Radar transmitting and receiving means are mounted in signal communication with the first end of the horn antenna. A dielectric lens is mounted in the second end of the horn antenna and has an exterior surface shaped to reduce side lobe generation in the transmitted radar wave so as to reduce the beam width of the transmitted radar wave.

In a preferred embodiment, the lens has a generally plano-convex shape with a planar first surface facing the first end of the horn antenna and a convex surface facing outward from the second end of the horn antenna. The convex surface is formed at a predetermined radius of curvature. In a specific example, when the radar transmitter is operated at a frequency of 24.125 GHz and the horn antenna has an effective diameter of substantially three inches, a dielectric lens having a convex surface with a radius of curvature greater than one-half of the effective diameter of the lens, is effective to transmit a radar wave over a specified range having a beam width of 6°. This 6° beam width is sufficient to cover only one lane of roadway at the range of the radar and thereby prevents the detection of objects or vehicles located in adjacent lanes or to the sides of the lane on which the vehicle employing the radar apparatus of the present invention is located.

The vehicle radar safety apparatus of the present invention also optionally includes speed control means, responsive to the signal processing means, for automatically applying the vehicle brakes and/or moving the vehicle accelerator to a position to slow the vehicle upon generation of the first output from the signal processing means. The speed control means preferably comprises an accelerator control means, mounted in the vehicle and coupled to the vehicle accelerator, for moving the accelerator in a direction to slow the vehicle in response to the first output from the signal processing means. Brake control means, coupled to the vehicle brake system, are also mounted in the vehicle for applying the vehicle brakes in response to the first output from the signal processing means.

In vehicles having automatic cruise control, the vehicle radar safety apparatus also includes the speed control means generating a signal in response to the first output from the signal processing means for deactivating the automatic cruise control.

The speed control means may optionally include a brake pedal depression sensing means for sensing depression of the vehicle brake pedal. The brake pedal sensing means generates an output signal indicative of depression of the vehicle brakes, which output signal is input to the signal processing means to deactivate the brake and/or accelerator control means.

The vehicle radar safety system also includes a water sensor means, mounted on the vehicle, for generating an output signal indicative of the presence of water in the path of movement of the vehicle. The signal processing means, in response to the output signal from the water sensor means, increases the distance threshold at which the first output is generated by the signal processing means. Further, a selector switch is mounted on the operator control and display console to selectively switch the vehicle radar safety apparatus between a warning system and a warning and automatic brake and accelerator control system. This selector switch is input to the signal processing means which disables the automatic accelerator and brake control means for a predetermined amount of time, i.e., twenty seconds.

In addition to the front sensor means, the radar means may be coupled to the rear sensor for detecting the presence of an object to the immediate rear of the vehicle. The vehicle radar safety system operates in substantially the same manner as described above to control the accelerator and brakes of the vehicle and/or provide only a warning indication to the operator of the presence of a vehicle to the rear of the vehicle when the vehicle is in reverse. Optionally, the rear sensor and signal processing means may provide only a warning indication to the operator vehicle without any automatic accelerator and/or brake control.

Side sensors in the form of proximity radars may also be mounted on the vehicle for indicating the presence of an object to the side of the vehicle. This is particularly suited for the side "blind spots" on the vehicle and provides an indication to the operator of the vehicle of the presence of objects to either side of the vehicle.

The vehicle radar safety apparatus of the present invention uniquely enables a small effective diameter radar to be operated at high operating frequencies sufficient to detect objects to the front and/or rear of the vehicle while providing such a radar in a smaller diameter than previously thought possible in vehicle radar systems. The radar also operates at frequencies heretofore not possible in vehicle radar applications with the desired small effective radar diameter and narrow beam width.

The vehicle radar safety apparatus of the present invention also provides the operator of the vehicle with control over the with regard to providing a selection between warning and active accelerator and brake control system or merely a warning system. The vehicle radar system of the present invention also automatically adapts for changing road conditions, i.e., wet or dry.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
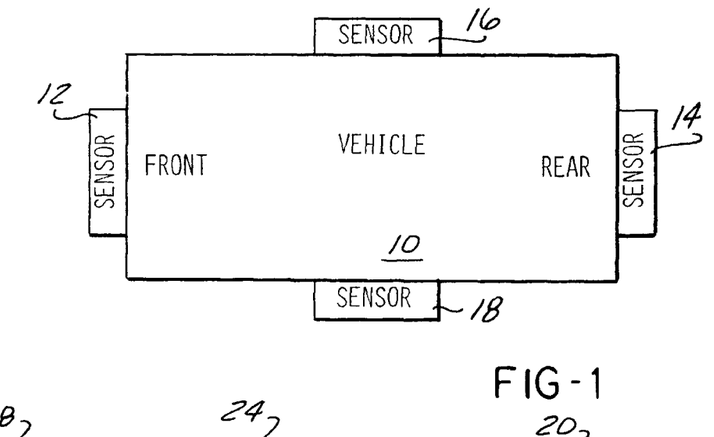
FIG. 1 is a block diagram of a vehicle and the location of the sensors of the vehicle in accordance with the present invention.
Figure 2:
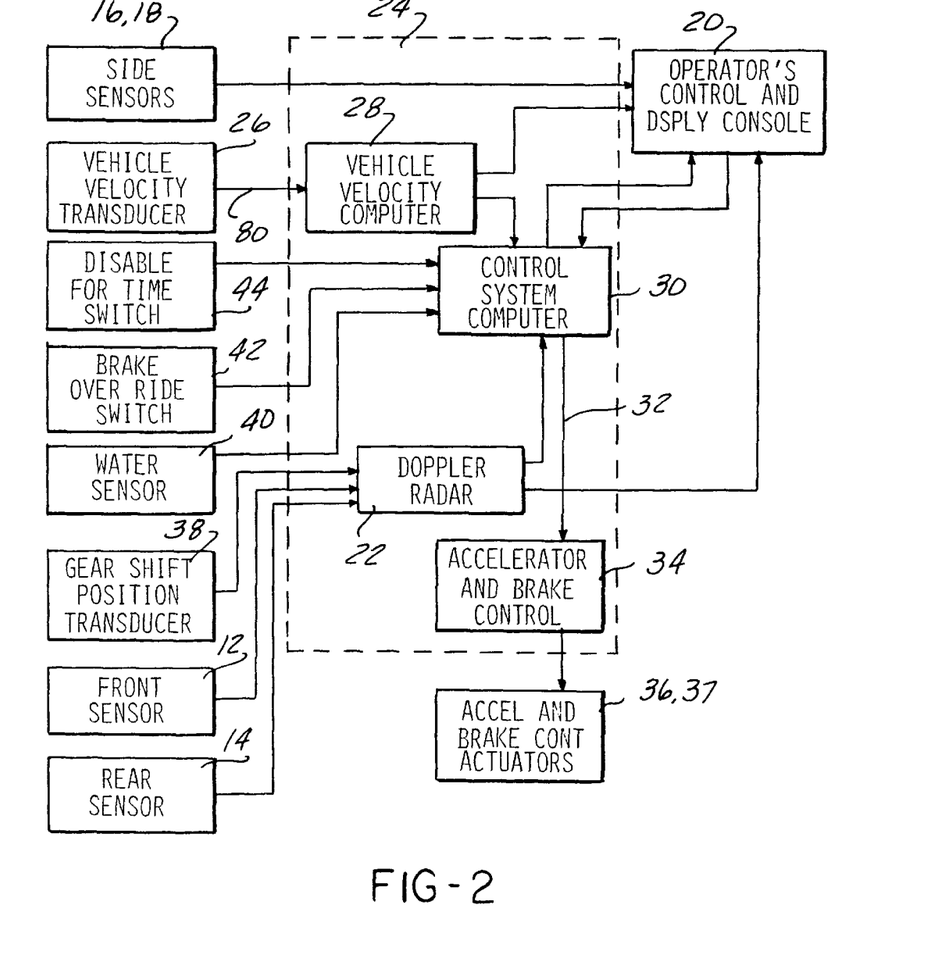
FIG. 2 is a block diagram of the vehicle radar safety system of the present invention.

Referring now to the drawing, and to FIGS. 1 and 2 in particular, there is illustrated a vehicle radar safety apparatus for detecting the presence of object near a moving vehicle and for indicating to the operator of the vehicle the vehicle's capability of stopping prior to colliding with the detected object. As shown in FIG. 1, a vehicle 10 has a plurality of sensors mounted thereon for detecting objects in the vicinity of the vehicle 10. Front sensor 12 is mounted in the front of the vehicle 10 for detecting objects in front of the vehicle 10. Optional rear sensor 14 is mounted on the rear of the vehicle 10 to detect objects to the rear of the vehicle 10. Optional side sensors 16 and 18 are mounted on the sides of the vehicle 10, at approximately the middle of the sides of the vehicle 10, to detect objects to the side of the vehicle 10, such as objects in a blind spot normally occurring on the sides of the vehicle 10.

As shown in FIG. 2, the side sensors 16 and 18 are connected to an operator control and display console 20 which is mounted in the vehicle 10 in a convenient location so as to be easily visible to the operator of the vehicle 10. Front sensor 12 and rear sensor 14 are antennas connected to a Doppler radar means 22 which is part of a signal processing control means 24. A vehicle velocity sensing means, such as a transducer 26, is mounted on the vehicle and generates an output signal indicative of the velocity of the vehicle 10. This output signal is applied to a vehicle velocity computing means 28 which computes the velocity of the vehicle based on the output of the vehicle velocity sensing means or transducer 26. One output from the vehicle velocity computing means 28 is applied to the operator control and display console 20. Another output of the vehicle velocity computing means 28 is applied to a control system computing means or computer 30.

The control system computer 30 computes the distance required for the vehicle 10 to stop based on existing road conditions and the velocity of the vehicle and compares this computed value with the range or distance of an objected detected in front of the vehicle 10. The range or distance between the object detected by the front sensor 12 and the vehicle 10 is computed by the Doppler radar means 22. Based on this comparison, the control system computer 30 generates a first output which is indicative of the vehicle's ability to stop prior to colliding with the detected object. This output is applied to the operator control and display console 20 which provides an indication to the operator of the vehicle that the vehicle is approaching a distance from the object in front of it at which it will not be able to stop if the object in front of it is stationary or suddenly stops.

One output 32 of the control system computer 30 is optionally applied to an accelerator and brake control means 34 which generates a signal to suitable accelerator and brake control actuators shown in general by reference numbers 36 and 37, respectively, to automatically move the vehicle accelerator to a position to slow down the vehicle and/or apply the vehicle brakes.

Also input to the signal processing unit or means 24, and described in greater detail hereafter, is a gear shift position detection means or transducer 38. The gear shift position detection means or transducer 38 is input to the Doppler radar 22 and provides a signal indicative of the direction of movement of the vehicle 10. A water sensor means 40 is input to the control system computer 30 and detects the presence of water on the road surface. This signal is utilized by the control system computer 30 to increase the threshold distance at which a signal is provided to the operator of the vehicle 10 indicating that the vehicle is approaching a collision point with a detected object. Also input to the control system computer are a brake override switch 42 and a disable for time switch 44, both of which will be described in greater detail hereafter.

Figure 4:
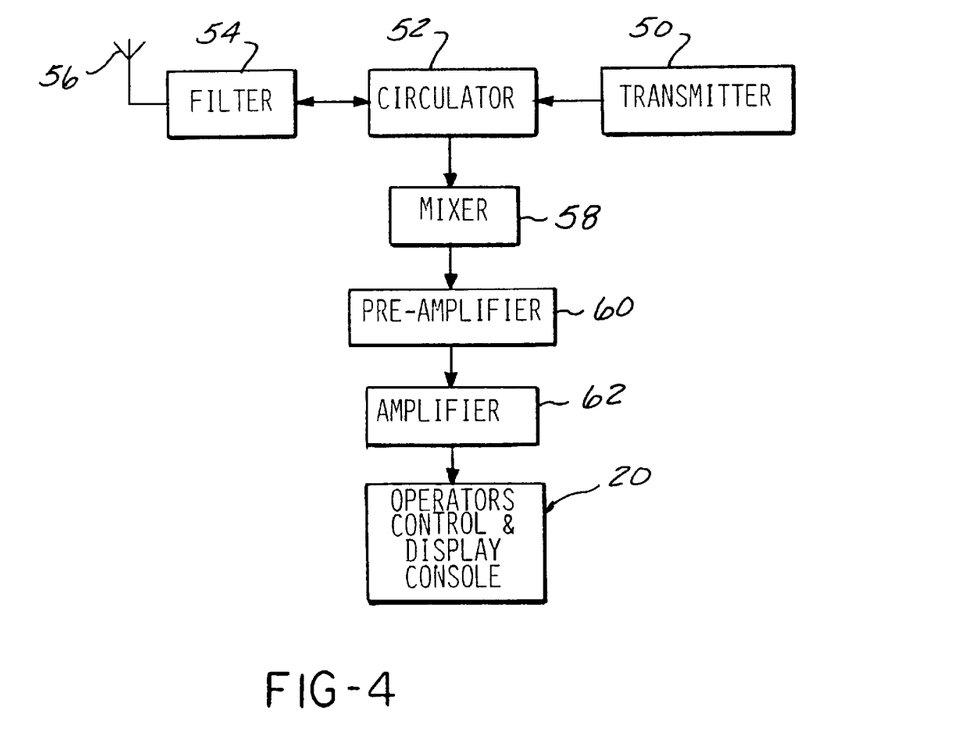
FIG. 4 is a block diagram of a proximity radar used in one embodiment of the present invention.

Referring now to FIG. 4, there is depicted an example of the circuitry employed with a typical side sensor 16 or 18. The side sensor 16 includes a radar transmitter 50, the output of which passes through a circulator 52 and filter 54 to an antenna 56. The signal radiated by the antenna 56 is reflected off of an object and is received by the antenna 56 and the filter 54 and passes through the circulator 52 to a mixer 58, preamplifier 60, and amplifier 62. The output of the amplifier 62 is applied to an indicator, not shown, on the operator control and display console 20.

Figure 3:
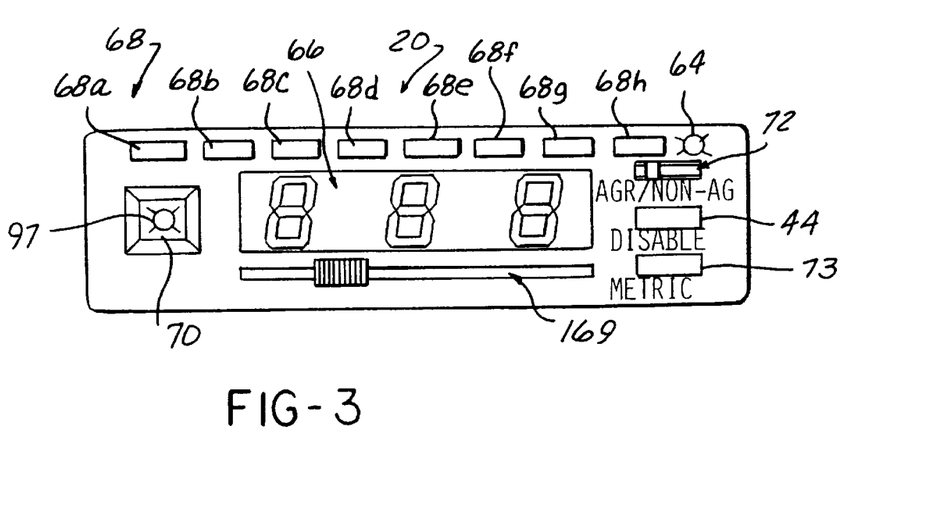
FIG. 3 is a front elevational view of the operator control and display console of the present invention.

As shown in FIG. 3, the operator display and control console 20 includes a display 66 for indicating the distance computed by the Doppler radar 22 between the vehicle 10 and an object detected in front of the vehicle. The display 66 may be any type of display, such as a digital or analog display. Also mounted on the operator display and control console 20 is a bar display 68 formed of a plurality of serially-arranged, light-emitting diodes (LED's) 68a, 68b, etc. The LED's 68a, 68b, etc., are sequentially illuminated by the control system computer 30, as described hereafter, to provide an indication to the operator of the vehicle 10 of how fast the vehicle 10 is approaching a point from an object detected in front of the vehicle 10 at which the vehicle 10 will be incapable of stopping prior to colliding with the detected object. An on/off switch 70 is mounted on the operator control and display console 20 for activating and de-activating the vehicle radar safety system of the present invention. A slide switch 72 is mounted on the console 20 and provides an operator selection between aggressive and non-aggressive driving conditions. The operation of the switch 72 will be described in greater detail hereafter. A disable for time switch 44 is mounted on the console 20 to disable the automatic accelerator and brake control means 34 for a predetermined amount of time, such as twenty seconds, as described hereafter. A metric select switch 73 is coupled to the display 66 and the radar means 22 to convert the display 66 output to meters.

Figure 5:
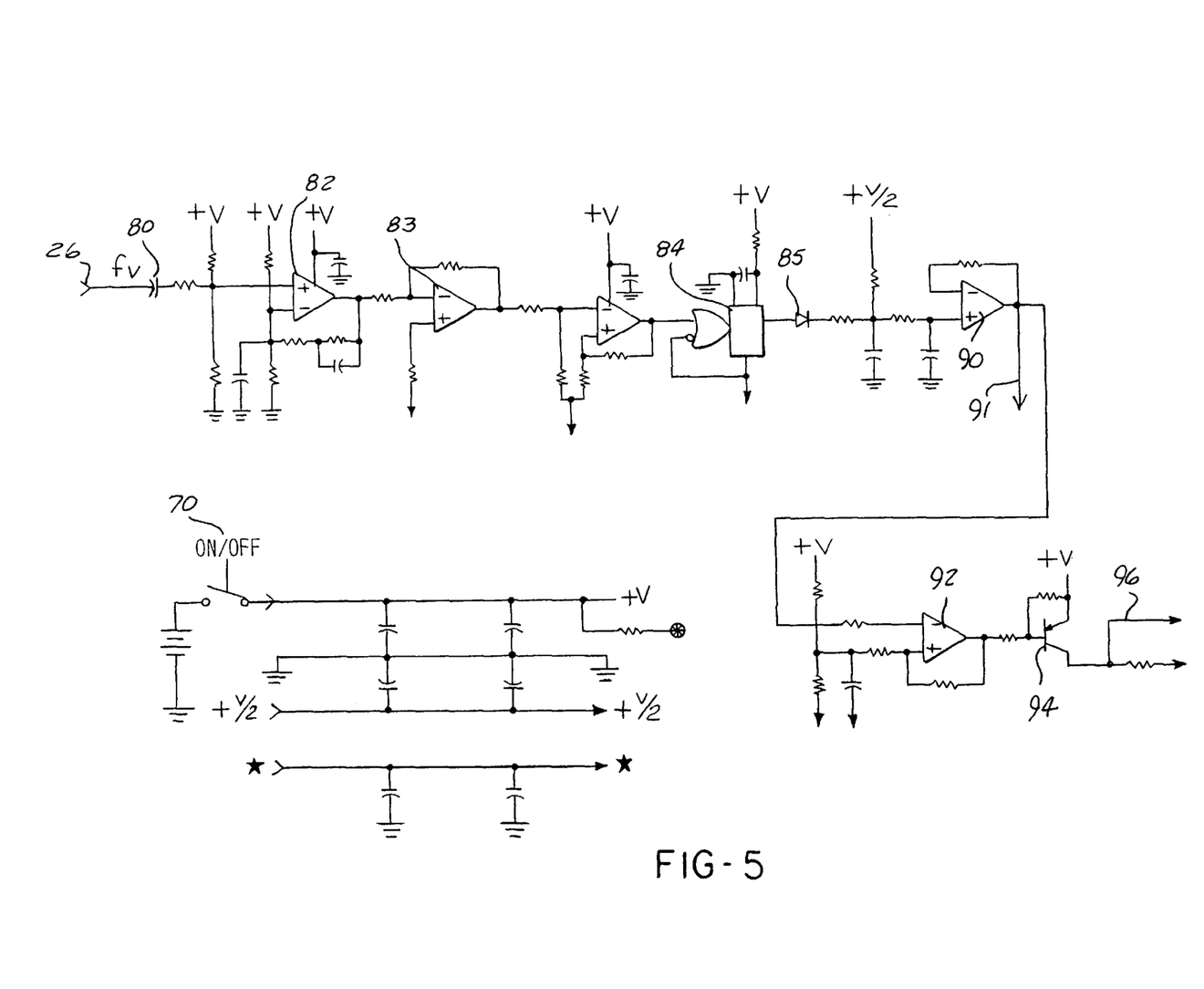
FIG. 5 is a schematic diagram of the vehicle velocity computer employed in the present invention.

A typical circuit for the vehicle velocity computing means or computer 28 is depicted in FIG. 5. The vehicle velocity detection means or transducer 26 produces an electrical signal having a frequency of $f_v$. This signal is applied to an amplifier 82 and a comparitor 83, the output of which is applied to a monostable multivibrator 84. The output of the multivibrator 84 is applied across a diode 85 which generates a voltage signal to an amplifier 90, the output of which is connected to a second amplifier 92. The output of the second amplifier 92 is connected to a drive transistor 94 which provides a signal 96 to turn on the Doppler radar 22 and to illuminate an LED 97 in the console 20. The output signal 96 to the Doppler radar 22 is generated only when the vehicle velocity exceeds a predetermined value, such as ten miles per hour, as set by the reference input to the comparitor 83. At speeds lower than this preset value, the vehicle radar safety system of the present invention will be inactive, despite the on/off switch 70 being in the "on" position. This is due to the fact that any collision between the vehicle 10 and an object at speeds below the preset value are considered to be relatively safe. Of course, other preset trigger speeds may also be employed.

The on/off switch 70 is connected to a conventional power supply circuit to generate the voltage level signals needed to operate the electronic components of the vehicle radar safety system.

Figure 6:
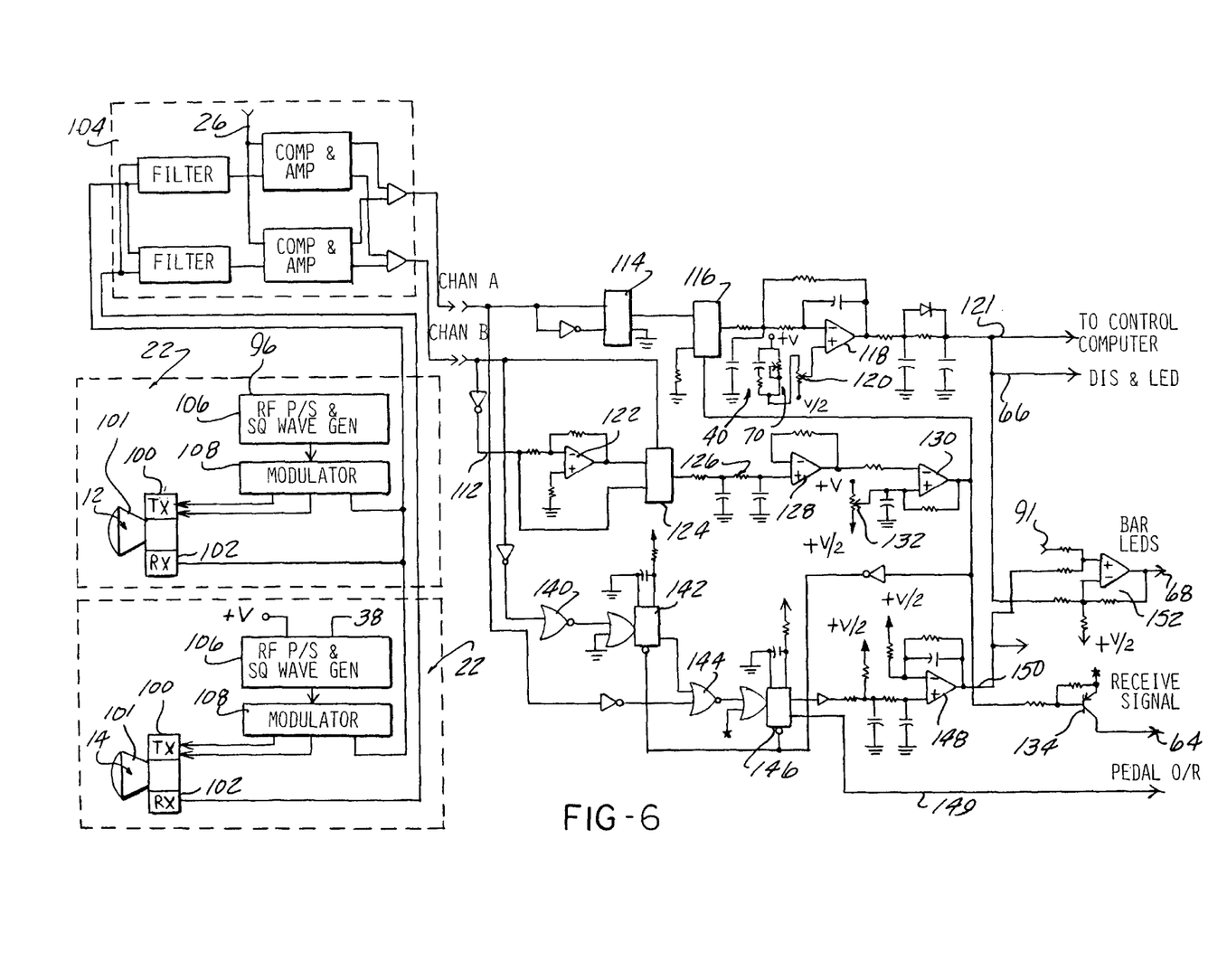
FIG. 6 is a block and schematic diagram of the Doppler radar and control logic employed in the vehicle radar safety system.

FIG. 6 depicts the Doppler radar means 22 which detects the range and closing speed between the vehicle 10 and objects to the front and, optionally, to the rear of the vehicle 10. The radar means 22 operates in a continuous wave Doppler mode with opening Doppler rejection and includes an RF power supply and squarewave generator 106, when activated by signal 96 indicating that the vehicle 10 is above a predetermined speed, supplies a squarewave RF signal through a modulator 108 to a radar transmitter 100. The transmitter 100 emits microwave energy through a horn antenna 101 which constitutes the front sensor 12 and which defines the degrees of beam width of the transmitted energy. A return signal reflected off of an object is received by the antenna 101 and a receiver 102. The receiver 102 output and the output of the modulator 108 are input to a filter 104.

Figure 8:
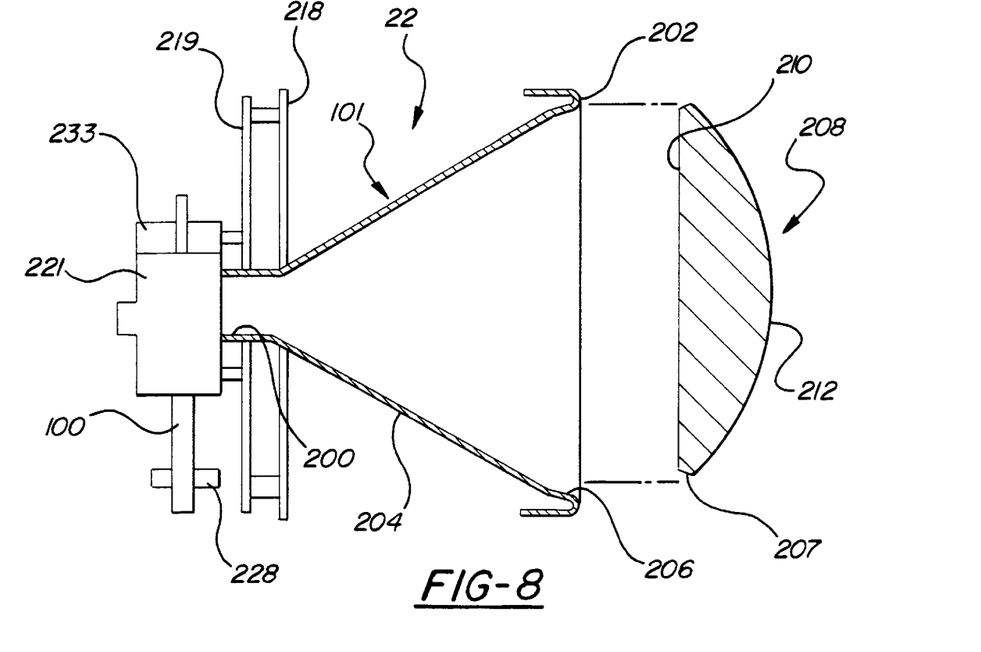
FIG. 8 is an exploded, side elevational, cross sectional view showing the construction of the horn antenna employed in the radar means of the present invention.
Figure 10:
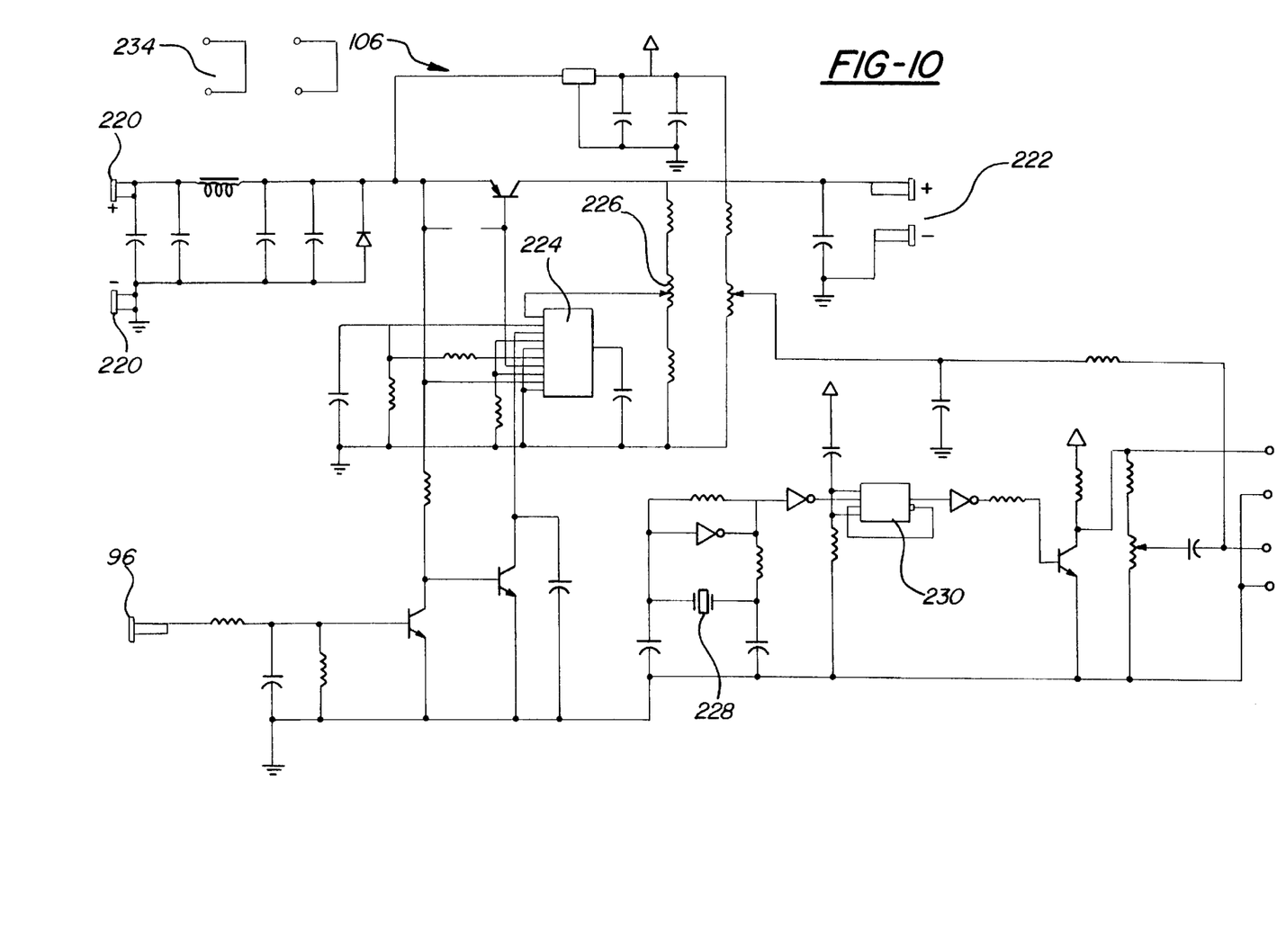
FIG. 10 is a schematic diagram of the RF power supply circuit employed in the radar means of the present invention.

FIG. 10 depicts the RF power supply and squarewave generator circuit 106 which is contained on a circuit board 218 mounted along with a heat sink 219 about the horn antenna 101 as shown in FIG. 8. Input power from a suitable source 220 is supplied through a transformer and filter network to provide output power at leads 222 to the transmitter 100. This power is regulated by an adjustable voltage regulator 224, IC Chip No. LM7230N, which provides an adjustable output voltage. This voltage is precisely set by a potentiometer 226 to generate the preferred +5 V output power to the transmitter 100. Power to the transmitter 100 is initiated by the input 96 as described hereafter.

The input 96 also activates a crystal oscillator 228 which through a flip-flop 230 and associated gating circuitry supplies the specified frequency to the transmitter 100 on leads 232. By way of example, this frequency is 24.150 GHz ±25 MHz.

In a manner similar to the circuit shown in FIG. 4 for the side sensors 16, 18, the transmitter 100 output is modulated in a circular manner at the rate of 1,000 cycles per microsecond by sweeping the voltage applied to the varactor of the transmitter 100 with a triangular waveform. The modulated transmitter 100 output passes through a circulator 221, FIG. 8, before being applied to the radar antenna 101. The circulator 221 functions to transmit the radar wave as well to receive a radar wave reflected off of an object detected in the direction of movement, i.e., front or rear, of the vehicle. When receiving a reflected radar signal, the circulator 221 passes such received signal to a detector means 233, such as a Gunn diode, which is connected across terminals 234 in FIG. 10. The output of the diode 233 is connected to filters 104 described hereafter.

An identical Doppler radar means 22 is also provided for the rear sensor 14 as shown in FIG. 6. The RF power supply and squarewave generator 106 is energized by a (+V) signal through the ON/OFF switch 70 and an output signal from the gear shift selector 36 when the vehicle 10 is in reverse.

The squarewave generator 106 and modulator 108 generate a squarewave signal which is transmitted by the front sensor 12, for example, at a frequency of $f_\phi$. The transmitted signal from the front sensor 12 is reflected off of an object located in front of the vehicle 10 and is received by the front sensor 12 at a frequency $f_1$ greater than $f_\phi$ if the vehicle 10 is moving faster than the detected object. The reflected signal is at a frequency $f_2$ which is less than $f_\phi$ if the object is moving faster than the vehicle. The difference between $f_\phi$ and $f_1$ or $f_\phi$ and $f_2$ is indicative of the distance and the relative velocity or closing speed between the vehicle 10 and the detected object.

As shown in FIG. 8, the horn antenna 101 has first and second spaced ends 200 and 202, respectively. A side wall 204 of the horn antenna 101 is shaped in the form of a funnel and tapers inwardly from the second end 202 to the first end 200. The transmitter 100, circulator 221 and detector diode 233 are mounted in signal communication with the first end 200 of the horn antenna 101. The circuit board 218 and heat 219 are mounted to the transmitter housing adjacent the first end 200.

The second end 202 of the horn antenna 101 has a separate inclined portion 206 which is adapted to fittingly receive one end of a dielectric lens 208. The dielectric lens 208 is fixedly mounted in the inclined portion 206 at the second end 202 of the horn antenna 101 by suitable means, such as a press fit, adhesives, etc.

The dielectric lens 208 is formed of any suitable material which is transparent to microwave radiation. In a preferred example, the dielectric lens 208 is formed of Rexolite 1442, sold by C-LEC Plastics, Inc., Beverly, N.J.

Figure 9:
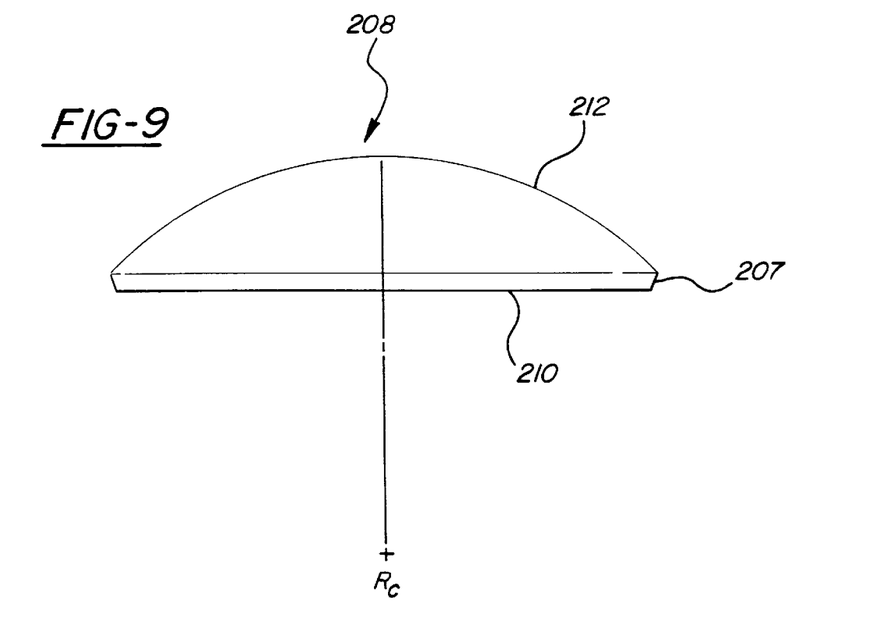
FIG. 9 is a side elevational view of the lens employed in the radar means of the present invention.

As shown in FIGS. 8 and 9, the dielectric lens 208 has a first surface 210 which faces the first end 200 of the horn antenna 101 when the dielectric lens 208 is mounted in the second end 202 of the horn antenna 101 and an opposed second surface 212. The second surface 212 which faces outward from the second end 202 of the horn antenna 101 and is an exterior surface on the dielectric lens 208 is shaped to reduce side lobe generation in the transmitted radar wave from the horn antenna 101. In a preferred embodiment, the dielectric lens 208 has a generally plano-convex shape with a substantially planar first surface 210 and a convex second or exterior surface 212. The radius of curvature ($R_c$) of the second surface 212 is preferably greater than one-half of the effective diameter of the dielectric lens 208. This specified convex shape for the exterior surface 212 of the dielectric lens 208 effectively reduces side lobe generation in the transmitted radar wave so as to reduce the beam width of the transmitted radar wave. An annular inclined edge portion 207 is formed adjacent the first end 210 of the dielectric lens 208 to conform to the inclined portion 206 at the second end 202 of the horn antenna 101 and enable a secure mounting of the dielectric lens 208 in the second end 202 of the horn antenna 101.

In a specific example, which is provided only to explain the unique features of the radar means 22 of the present invention and is not meant to limit the novel features of the radar means to the specified dimensions, the dielectric lens 208 is formed to have an effective diameter of substantially three inches, i.e., 2.85 inches, when transmitting a radar wave at a frequency of 24 GHz. The radius of curvature ($R_c$) of the exterior convex surface 212 is approximately 2.125 inches. This construction minimizes side lobe generation in the transmitted radar wave so as to produce a transmitted radar wave having a beam width of approximately 6° over the range of the transmitted radar wave and at the 24 GHz operating frequency.

Further, the interior surface 210 of the dielectric lens 208 is spaced at a predetermined distance from the radar beam transmitting means and, in particular, the exterior surface of the circulator 221. With the lens 208 having a subtanstially three inch effective diameter at a radar operating frequency of 24 GHz., this distance is substantially equal to the diameter of the lens 208 or substantially three inches. This dimensional relationship uniquely provides the desired 6° beam width to cover one lane of roadway with a three inch effective diameter antenna and a radar operating frequency of 24 GHz.

It will be understood that other effective diameters and operating frequencies may also be employed with a dielectric lens shaped in accordance with the teachings of the present invention, with the radius of curvature or exterior surface shape of such dielectric lens being selected to provide a transmitted radar wave of a beam width less than the beam width which normally occurs with the operation of the radar at a specified effective diameter and operating frequency. Thus, the radar means 22 may be provided with an effective diameter of between substantially three inches and six or more inches, with the operating frequency remaining constant, such as at 24 GHz. Only the shape of the exterior surface 212 of the dielectric lens 208 need be varied to different radius of curvatures so as to provide a transmitted radar wave having a specified beam width, such as 6°, which is effective to cover one lane of roadway.

The outputs of the modulators 106 and the receivers 102 of the front and rear Doppler radar means 22 are respectively tied together and input as signals to a high pass filter network 104. The filter network 104 includes two separate channels each containing filter comparison and amplifier elements to filter or clip signals outside of the frequency range of the filter network 104. Specifically, the filter network 104 filters high frequency signals indicative of high closing speeds typically present in a head-on approaching vehicle situation where no braking is desired for safety purposes. The separate channels in the filter network 104 detect differences between $f_0$, $f_1$ and $f_2$ signals from the Doppler radar means 22 which are output as signals: CHAN A corresponding to the $f_0$ frequency of the transmitted radar beam and CHAN B which corresponds to the $f_1$ or $f_2$ frequency of the received radar beam. The window or offset between corresponding portions of the CHAN A and B squarewave signals is proportional to the distance between the vehicle 10 and the detected object; while the rate of shift between the CHAN A and B signals relates to the closing velocity as described hereafter.

The CHAN A signal is input to a flip-flop 114, the output of which is connected to a second flip-flop 116. The output of the second flip-flop 116 is input to an amplifier 118 on the inverting (−) lead of the amplifier 118. A variable resistor or potentiometer 120 is connected to the non-inverting or (+) input of the amplifier 118. The potentiometer 120 provides a variable threshold signal 121 to the amplifier 118. The output of the amplifier 118 supplies an output signal to the control system computer 30 indicative of the distance between the vehicle 10 and the object detected in front of the vehicle 10 as well as an output signal to the distance display 66 on the operator control and display console 20.

The aggressive/non-aggressive slide switch 72 and the water sensor means 40 are connected in parallel with each other. This parallel network is then serially connected to the potentiometer 120 and operates to vary the distance threshold reference signal depending on the road conditions and the driving preference of the vehicle operator. When the road is wet, the water sensor electrodes mounted externally on the vehicle 10 will be bridged by the water thereby forming a circuit to add resistance and vary the reference voltage at one input of the amplifier 118. When water is detected, the distance threshold will be increased to generate an alarm indication of a potential collision with a detected object at a greater distance than on dry roads. The switch 72 operates in a similar manner to vary the distance threshold upon operator preference.

A signal quality signal is generated by the CHAN B signal as a linearity signal 112 from the Doppler radar means 22. The linearity signal 112 is input to an amplifier 122, the output of which is connected to a flip-flop 124. The output of the flip-flop 124 passes through a filter 126 to an amplifier 128. The output of the amplifier 128 is connected to the inverting input of an op amplifier 130. The non-inverting input of the amplifier 130 receives a signal from a variable resistor or potentiometer 132 which sets a minimum threshold of signal quality. The output of the amplifier 130 is connected to a drive transistor 134 which generates an output signal, when activated, indicative of a good signal corresponding to the detection of an object in front of the vehicle 10. This signal is supplied to an LED 64 on the console 20.

The CHAN A and CHAN B signals are also input through a NOR gate 140 to a comparitor 142. The output of the comparitor 142 is input to a NOR gate 144 along with an inverted CHAN A signal. The output of the NOR gate 144 is connected to a flip-flop 146.

The flip-flops 142 and 146 form a direction selection circuit which detects a shift in the Doppler signals from the radar means 22. This is determined by the frequency shift between the CHAN A and CHAN B signals to indicate a closing or opening Doppler frequency shift indicative of the vehicle 10 closing on the detected object or the object pulling away from and having a higher velocity than the vehicle 10.

The flip-flop 142 creates a 180 millisecond window of the CHAN A and CHAN B digital signals input thereto. The output of the flip-flop 142 through the NOR gate 144 and an inverted CHAN A digital signal are input to the flip-flop 146. The output of the flip-flop 146 will be high only when the difference in the CHAN A and CHAN B digital signals indicates a shift in the Doppler signals from the radar means 22 corresponding to a positive closing speed, i.e., the vehicle 10 is closing on and moving at a higher rate of speed or velocity than the detected object which, therefore, has a lower velocity. The output of the flip-flop 146 is a chopped signal such that the output of the amplifier 148 on line 150 is indicative of the actual closing speed between the vehicle 10 and the detected object. There will be no output from the flip-flop 146 to the amplifier 148 when there is not a positive closing speed between the vehicle 10 and the detected object as would occur when the detected object has a higher velocity than the vehicle 10 and is pulling away from the vehicle 10. Thus, in this situation, no indication or corrective action is necessary.

The output of the flip-flop 146 is input to a closing speed detection circuit including an operational amplifier 148. The amplifier 148 generates an output signal indicative of the closing speed between the vehicle 10 and the object detected in front of the vehicle 10. The output signal 150 is input to the closing speed LED's 68 on the operator control and display console 20. The output signal 150 is input to a suitable driver amplifier 152, as shown in FIG. 6, which drives the LED's 68a, 68b, etc. Each LED 68a, 68b, etc., is biased to conduct at different voltage levels, such that the amount of frequency shift will cause the number of LED's 68a, 68b, etc., which are illuminated to vary.

Figure 7:
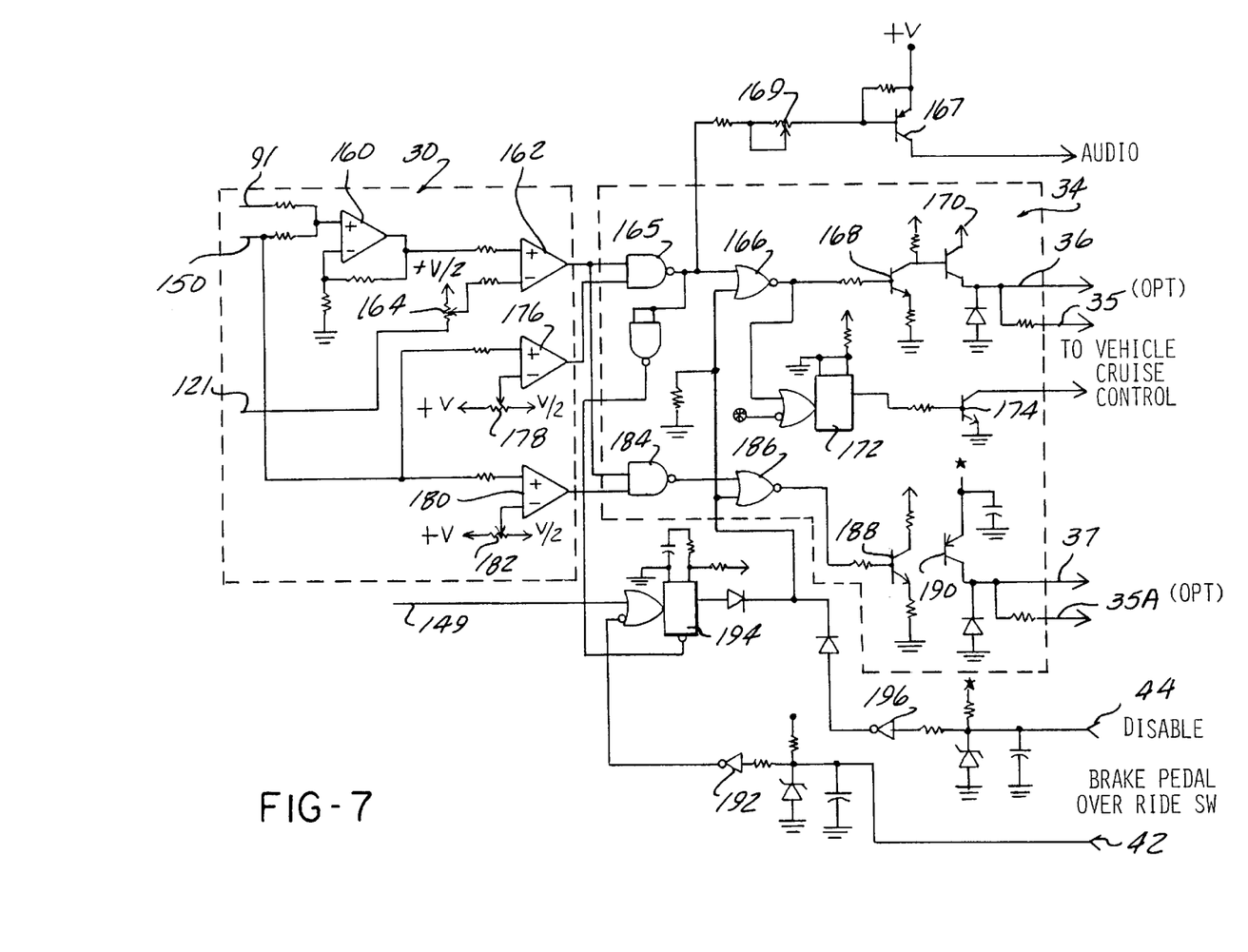
FIG. 7 is a schematic diagram of the signal processing unit used in the vehicle radar safety system.

The output signal 150 from the closing speed calculating circuit is input to the control system computer 30 shown in detail in FIG. 7. The closing speed signal 150 from the amplifier 148, which is present only when there is a positive closing speed, is summed with the vehicle velocity signal 91 and input to a first operational amplifier 160. The output of the first operational amplifier 160 indicative of the summed value of the closing speed of the vehicle 10 with respect to an object detected in front of the vehicle 10 and the velocity of the vehicle 10 is connected to the non-inverting input of a second operational amplifier 162. The distance output signal 121 indicative of the range or distance between the vehicle 10 and the object detected in front of the vehicle 10 is connected through a potentiometer 164 to the inverting input of the second operational amplifier 162. This distance signal forms a threshold such that the first output from the control system computer 30 from the second operational amplifier 162 is generated when the summed value of the closing speed and vehicle velocity exceeds the threshold value established by the distance signal. The output of the second operational amplifier 162 is connected to the accelerator and brake control logic, shown in general by reference number 34, which is an optional feature of the vehicle radar safety system of the present invention.

The output of the amplifier 162 is connected through a serial arrangement of NAND gate 165 and NOR gate 166 to drive transistors 168 and 170 which are connected to an accelerator actuator 36 connected to the vehicle accelerator. When an output is generated by the amplifier 162, the drive transistors 168 and 170 will conduct thereby activating the accelerator actuator 36 to move the accelerator in the vehicle 10 to a position to slow down the vehicle. An optional LED 35, shown only in FIG. 7, may be provided to indicate the energization of the accelerator actuator 36.

The output of the NOR gate 166 is also input to flip-flop 172. An output of the flip-flop 172 is connected to a driver 174 which generates a signal to disable the vehicle cruise control. This is an optional feature which automatically deactivates the vehicle cruise control when the accelerator control means 36 is activated by the vehicle radar safety apparatus.

The threshold value or point at which the accelerator control 36 is activated is determined by the output of an amplifier 176 in the control system computer 30. The closing speed signal 150, which is present only when there is a positive closing speed, as described above, and which is proportional to the actual closing speed, is connected to one input of the amplifier 176. A potentiometer 178 is connected to the other input of the amplifier 176 and sets a threshold value to activate the accelerator actuator 36 when the threshold value is exceeded by the closing speed. The output of the amplifier 176 is connected as one input to the NAND gate 165.

A similar circuit exists for the brake controls. An amplifier 180 receives the closing speed signal 150 as one input. A potentiometer 182 is connected to the other input of the amplifier 180. The output of the amplifier 180 is connected to a NAND gate 184 which, through a NOR gate 186, is connected to drive transistors 188 and 190 which drive a brake actuator 37, such as a proportional valve, not shown, to activate the vehicle brakes when a predetermined value is sensed by the vehicle radar safety apparatus to prevent a collision between the vehicle 10 and an object detected in front of the vehicle 10. An optional LED 35 as shown only in FIG. 7 may be provided to indicate energization of the brake actuator 37.

The vehicle radar safety apparatus also includes an optional brake override circuit which receives an input signal from a brake override switch 42 which detects any depression of the vehicle brake pedal by the operator of the vehicle 10. This signal is input through an amplifier 192 to a flip-flop 194 along with a second input signal 149 from flip-flop 146. The output of the flip-flop 194 is connected through control logic in the accelerator and brake control circuit 34 to the accelerator and brake actuators 36 and 37 to automatically deactivate the accelerator and brake actuators 36 and 37 when the brake pedal is depressed by the operator of the vehicle 10.

The closing speed signal is connected through resistor 151, FIG. 6, to the pedal override signal 149 output from flip-flop 146. Resistor 151 is selected to generate a signal at a predetermined high closing speed, such as 30 mile per hour, for example, indicative of a head-on collision with an approaching vehicle. This signal, through flip-flop 194, as described above, will automatically deactivate the accelerator and brake actuators 36 and 37 to enable operator control of the vehicle, but will still indicate through audible and visual warnings of the danger.

The closing speed signal 150 through resistors 191 and 193 is connected as an input to NOR gate 166 and acts as an enable to allow activation of the accelerator actuator 36 only at certain closing speeds, such as, for example, closing speeds equal to or greater than one mile per hour. This enable signal based on closing speed is independent of an enable signal provided to NOR gate 186 which activates the brake actuator 37 as described above. The closing speed signal 150 through resistor 193 is connected to NOR gate 186 to enable NOR gate 186 only at certain closing speeds, i.e., closing speeds greater than or equal to three miles per hour. In this way, at closing speeds between one and three miles per hour, only the accelerator actuator 36 can be energized. At closing speeds equal to or greater than three miles per hour, both of the accelerator and brake actuators 36 and 37 can be energized.

As shown in FIG. 7, the closing speed signal 150 is also connected through resistor 190 which energizes the brake actuator 37 as described above. This signal will vary in proportion to the closing speed and will cause the proportional valve of the brake actuator 37 to be opened a variable amount proportional to the magnitude of the closing speed. Higher closing speeds will cause a large opening of the outlet orifice of the brake actuator valve and result in higher pressure being applied to the vehicle brakes. Lower closing speeds will result in less brake pressure.

Another optional circuit provides the operator of the vehicle with the capability of operating the vehicle radar safety system in an active mode in which an indication and automatic control of the vehicle accelerator and brakes are possible or, alternately, a warning mode only in which no active control of the accelerator and brake occurs. An input signal from a disable for time switch 44 mounted on the vehicle operator control and display console 20 is input through an amplifier 196 to the accelerator and brake control logic 34 shown in FIG. 7. When the signal from switch 44 is active or "on", the signal will deactivate the accelerator and brake actuators 36 and 37 such that only a warning indication will be provided on the operator display and control console 20 that the vehicle is approaching an object detected in front of the vehicle 10.

The output of the NAND gate 165 is input through a potentiometer 169 to a drive transistor 167 which drives an audible alarm or beeper in the console 20. The potentiometer 169 is the slide switch 169 shown in FIG. 3 on the console 20. The output of the amplifier 162, which is proportional to the excess or difference of the combined closing speed and vehicle speed signals over the distance signal, is also connected to the potentiometer 169 through a resistor 163. The variable magnitude signal from the resistor 163 varies in response to the difference between the summed closing speed and vehicle speed signals and the distance signal, with higher magnitudes corresponding to greater differences. Since vehicle speed can be considered to be constant over short intervals, the magnitude of the signal through the resistor 163 will essentially vary in response to closing speed. This signal is summed with the output of the NAND gate 165 and through the potentiometer 169 and provides a variable base current to the transistor 167 to vary the rate or frequency of audible tones from the audible alarm. In this manner, the rate of audible tones generated by the audible alarm will be proportional to the closing speed, or, more generally, the difference between summed signal speed and closing speed and the distance, with higher closing speeds being indicated by more rapid pulse tones from the alarm.

When the vehicle 10 is in reverse, the vehicle radar safety system operates in substantially the same manner as described above except that the radar means 22 associated with the rear sensor 14 is immediately activated when the gear shift selector 38 is in reverse and not at prescribed vehicle speed. Further, the vehicle speed is assumed to be a constant high speed, i.e., 65 mph. Thus, the aggressive/non-aggressive switch 72 and the water sensor 40 have little if any effect on the system. Otherwise, the vehicle radar safety system operates in the same manner to detect an object to the rear of the vehicle 10 when the vehicle 10 is in reverse and to provide a warning and/or bring the vehicle 10 to a stop to prevent a collision with the detected object.

In summary, there has been disclosed a unique vehicle radar safety system which provides an indication of a vehicle's capability of stopping prior to colliding with an object detected to the front or, optionally, to the rear of the vehicle. The vehicle radar safety system may optionally provide automatic control of the vehicle accelerator and brake to automatically slow the vehicle down to prevent a collision when a predetermined distance, closing speed and vehicle velocity relationship is detected and computed by the vehicle radar safety system.

The vehicle radar safety system also provides operator control over the system insofar as selecting between a warning mode only which provides an indication that the vehicle is approaching too close to an object detected in front of the vehicle and an active mode in which both a warning and automatic control of the vehicle accelerator and brakes is provided. Further, depression of the vehicle brake pedal by the operator of the vehicle may also be employed to override the automatic accelerator and brake controls thereby providing the operator with the capability of slowing down the vehicle himself.

The vehicle radar safety system of the present invention provides a more accurate indication of vehicle conditions, such as closing speed, distance between the vehicle and a detected object, and the velocity of the vehicle, as well as providing selectability for the operator in determining driving conditions.

The vehicle radar safety system of the present invention also includes a unique radar means which generates a radar wave or beam having a narrow beam width sufficient to cover only one lane of roadway while being operated at a small effective diameter and high operating frequency. The use of a dielectric lens mounted at one end of a horn antenna in which the dielectric lens has a specified exterior surface shape to reduce side lobe radar wave generation results in a transmitted radar wave having a narrower beam width than that which would normally result from radar having a predetermined effective diameter at a specified operating frequency.

What is claimed is:

1. A vehicle radar safety apparatus for use on a moving vehicle comprising:

radar means for transmitting a radar wave in the direction of movement of the vehicle and for receiving a radar wave reflected off of an object in the direction of movement of the vehicle, the radar means including:
   a horn antenna having first and second spaced ends and a closed side wall tapering inwardly from the second end to the first end;
   the horn antenna having a substantially three-inch effective diameter at an operating frequency of substantially 24 GHz.;
   the transmitting means and the receiving means being mounted in signal communication with the first end of the horn antenna; and
   a dielectric lens mounted in the second end of the horn antenna at a predetermined distance from the transmitting means to produce a 6° center beam frequency radar beam width signal at the operating frequency, the dielectric lens having an exterior surface shaped to reduce side lobe generation in the transmitted radar wave, the exterior surface of the dielectric lens having a convex shape with a radius of curvature greater than one-half of the effective diameter of the lens;

vehicle velocity sensor means for sensing the velocity of the vehicle and for producing an output signal indicative of said vehicle velocity;

signal processing means for receiving the output of the radar means and the vehicle velocity sensor means and for producing a first output indicative of the vehicle's capability of stopping prior to colliding with an object detected in front of the vehicle by the front sensor means; and indicator means, coupled to the signal processing means, for receiving the first output, the indicator means producing an indication indicative of the vehicle's capability of stopping prior to colliding with a detected object in front of the vehicle;

the signal processing means including:
   the radar means producing a distance output indicative of the distance between the object detected in the direction of movement of the vehicle and the vehicle;
   means, responsive to the radar means, for indicating an increasing closure of the vehicle with respect to the detected object;
   closing speed generating means, responsive to the increasing closure indicating means, for producing a closing speed signal indicative of the increasing closing speed between the vehicle and the detected object only when an increasing closing speed is indicated by the increasing closure indicating means;
   vehicle velocity computer means, coupled to the vehicle velocity sensor means, for computing the vehicle velocity and producing a vehicle velocity signal when the vehicle velocity is above a predetermined amount;
   means for summing the closing speed signal and the vehicle velocity signal and producing a summed output thereof; and
   means, responsive to the summed output, the distance output of the radar means, and the increasing closure indicating means, for generating the first output when the summed output exceeds the distance output and the increasing closure indicating means indicates an increasing closure of the vehicle with respect to the detected object.

2. The vehicle radar safety apparatus of claim 1 wherein the surface opposed to the exterior surface of the dielectric lens has a planar shape.

3. The vehicle radar safety apparatus of claim 1 wherein:
   the peripheral edges of the dielectric lens taper radially inward and seat within the second end of the horn antenna.

4. The vehicle radar safety apparatus of claim 1 wherein the predetermined distance of the dielectric lens from the transmitting means is substantially equal to the diameter of the horn antenna at an operating frequency of substantially 24 GHz.

5. A radar apparatus comprising:

a horn antenna having first and second spaced ends and a closed side wall tapering inwardly from the second end toward the first end;

means, mounted in the first end of the horn antenna, for generating and transmitting a radar wave at an operating frequency of substantially 24 GHz. through the horn antenna into free space, the second end of the horn antenna having an effective diameter of substantially three inches at the operating frequency;

means, mounted at the first end of the horn antenna, for receiving a reflected radar wave received by the horn antenna; and a dielectric lens mounted in the second end of the horn antenna at a predetermined distance from the transmitting means to produce a 6° center beam frequency radar beam width signal at the operating frequency, the dielectric lens having an exterior surface shaped to reduce side lobe generation in the transmitted radar wave, the exterior surface of the dielectric lens having a convex shape with a radius of curvature greater than one-half of the effective diameter of the lens.

6. The radar apparatus of claim 5 wherein the opposed surface opposed to the exterior surface of the dielectric lens has a planar shape.

7. The radar apparatus of claim 5 wherein:

the peripheral edges of the dielectric lens taper radially inward and seat within the second end of the horn antenna.

8. The radar apparatus of claim 5 wherein:

the predetermined distance of the dielectric lens from the transmitting means is substantially equal to the diameter of the horn antenna at an operating frequency of substantially 24 GHz.

* * * * *